United States Patent [19]
Haraguchi et al.

[11] Patent Number: 4,544,251
[45] Date of Patent: Oct. 1, 1985

[54] COMPACT CAMERA

[75] Inventors: Keisuke Haraguchi; Toru Kando, both of Tokyo, Japan

[73] Assignee: Asahi Kogaku Kogyo Kabushiki Kaisha, Tokyo, Japan

[21] Appl. No.: 460,667

[22] Filed: Jan. 24, 1983

[30] Foreign Application Priority Data

May 8, 1982 [JP] Japan ............................ 57-66115[U]

[51] Int. Cl.[4] ............................................. G03B 17/02
[52] U.S. Cl. ..................................................... 354/288
[58] Field of Search .............. 354/288, 173, 202, 224, 354/171, 204–206, 213, 214, 195, 403, 212, 209, 170

[56] References Cited

U.S. PATENT DOCUMENTS 4,349,266 9/1982 Maeda et al. ...................... 354/288
4,351,598 9/1982 Suzuki et al. ...................... 354/288
4,401,377 8/1983 Sato et al. ......................... 354/173.1
4,419,000 12/1983 Yoshida et al. ................... 354/173.1

Primary Examiner—Vit W. Miska
Attorney, Agent, or Firm—Fleit, Jacobson, Cohn & Price

[57] ABSTRACT

A compact camera which includes an auto focus mechanism arranged above a shutter aperture between a film cartridge chamber and a film spool chamber at the same height above the light axis center as a strobe mechanism mounted above the spool chamber. A film winding and shutter charge gear is mounted above the film cartridge chamber and a film winding gear mounted between spool chamber and strobe mechanism. Gear transmission means are mounted between said gears and between an aperture and an auto focus mechanism, and serve for interlocking rotation of the gears.

4 Claims, 4 Drawing Figures

COMPACT CAMERA

This invention relates to a compact camera containing an auto focus mechanism and a strobe mechanism, in which the strobe mechanism and a spool chamber are arranged at the top and bottom, respectively, of the camera.

With the requirement for automation of cameras, a compact camera containing an auto focus mechanism and a strobe mechanism becomes popular. However, a compact camera's characteristics, light weight and small size, tend to be neglected. That is, a camera is provided with many functions for automatic operation, thus, compactness and light weight are ignored of necessity, Therefore, recently even a compact camera has a design, dimension and weight which are not so different from those of a large size camera. This creates inconvenience in portability and operation.

Generally speaking, since the auto focus mechanism used for a camera with a 35 mm lens shutter utilizes a so-called triangular surveying system the length of a base line between a range finder and a view finder, which is a measuring section of such a system, must not be shorter than a given length. Further, the auto focus mechanism also requires not lower than a given height, because a reflection mirror, an image focusing lens, and a light receiving element are integrated therein. Thus, a camera's main body needs a space to accommodate the length of a 25~35 mm base line and a height of more than 10 mm for accommodating the auto focus mechanism. Further, although the size of the strobe mechanism varies depending on an amount of light to be emitted, the required camera height for containing the strobe mechanism is about 10 mm. Therefore, each said numerical value is an indispensable condition for a compact camera, and these values cannot be reduced at present. Thus, miniaturization of a compact camera should be attempted in parts other than the auto focus mechanism and strobe mechanism.

Now, traditional compact cameras as shown in FIGS. 1 and 2 will be described. In the compact camera in FIG. 1, a strobe mechanism 2 is positioned over a cartridge chamber 3 of a camera main body 1, and the camera in FIG. 2 has a strobe mechanism 2 positioned over a spool chamber 4 of camera main body 1.

5 is a rewinding mechanism, 6', 6" are film winding and shutter gears, respectively, 7 is an auto focus mechanism, 8 is a finder, 9 is an aperture, 10 is a condenser, 11 is a battery and 12 is a film winding knob. The degree of miniaturization of these two cameras is examined. Height h below the light-axis center C of the cameras is almost identical in any type of camera, as parts to be contained are limited in size. Therefore, they are not large enough elements to affect the entire height of the camera's main body, thus, they are not considered. However, heights H and $H_0$, above light-axis center C, are varied according to the camera. In the compact camera shown in FIG. 1, height H, above light-axis center C, is the total of $H_1$ (half height of cartridge chamber 3), $H_2$ (height of rewinding mechanism 5) and $H_3$ (height of strobe mechanism 2) ($H = H_1 + H_2 + H_3$). Height $H_0$ above the light-axis center C of the compact camera shown in FIG. 2 is the total of $H_4$ (about half height of spool chamber 4), $H_2'$ (a part of the height of the film rewinder and shutter charge gear 6"), $H_3$ (height of strobe mechanism 2) and $H_6$ (projected height of auto focus mechanism 7) ($H_0 = H_2' + H_4 + H_6$). The following expression shows the difference between both cameras' heights:

$$H_0 - H = H_2' + H_3 + H_4 + H_6 - (H_1 + H_2 + H_3)$$

where, $H_2$ and $H_2'$ are gear unit height, thus, they are almost the same ($H_2 \approx H_2'$). Therefore, $H_0 - H = H_4 + H_6 - H_1$ is obtained. Then, $H_0 - H = H_6 - (H_1 - H_4)$. $H_1 - H_4$ is equivalent to height $H_5$, which is the difference between the half height of cartridge chamber 3 and the half height of spool chamber 4. Thus, $H_0 - H = H_6 - H_5$ is obtained. Therefore, both cameras' heights are the same if height $H_6$ and $H_5$ are the same. But, the smaller the value of height $H_5$, the larger the difference $H_0 - H$. This shows that the degree of miniaturization of the compact camera shown in FIG. 1 is superior to the other.

However, if $H_6$, the projected height of auto focus mechanism 7 of the compact camera shown in FIG. 2 is excluded, $H_7 = H_4 + H_2' + H_3$ can be obtained, and when said $H = H_1 = H_2 + H_3$ is compared with this, $H_2' \approx H_2$ and $H_3 = H_3$. Therefore, $H_1 > H_4$ and thus, $H_7 < H$. That is, the compact camera shown in FIG. 2 is more compact than that shown in FIG. 1.

If $H_6$, the projected height of auto focus mechanism 7 in the compact camera shown in FIG. 2, is reduced to 0, further miniaturization can be achieved. It is suggested to minimize said height $H_6$ as much as possible to accommodate auto focus mechanism 7 within height $H_7$, above light-axis center C". Miniaturization in terms of designing can be accomplished, if the film winding and shutter charge gear train 6" is partially contained within the space in which a part of film winding knob 12 is contained, height of the film winding and shutter charge gear train or mechanism 6" is lowered, and a margin 9a above aperture 9 is utilized.

SUMMARY OF INVENTION

The present invention is intended to achieve further miniaturization than that of existing compact cameras. According to the present invention, the auto focus mechanism accommodated in the camera's main body without extending to the same height as the strobe mechanism, the spool chamber is positioned below the strobe mechanism, and the transmission means for interlocking the revolution of the film winding and shutter charge gear and film winding gear on the spool chamber side are installed between the auto focus mechanism and aperture.

1—camera main body
2—strobe mechanism
3—cartridge chamber
4—spool chamber
6—film winding and shutter charge mechanism
7—auto focus mechanism
9—aperture
13—interlocking gear train
14—film winding gear train
15, 16—transmission gear C—light-axis center

DESCRIPTION OF ILLUSTRATIVE EMBODIMENT

Figure 1:
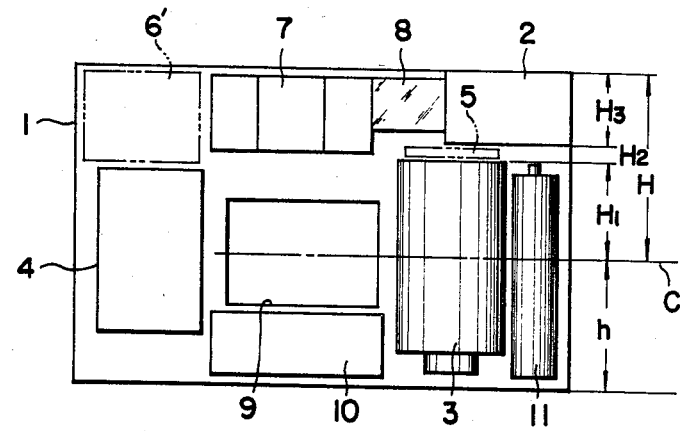
FIGS. 1 and 2 are front arrangement and block elevations of a traditional camera containing an auto focus mechanism and a strobe mechanism.
Figure 2:
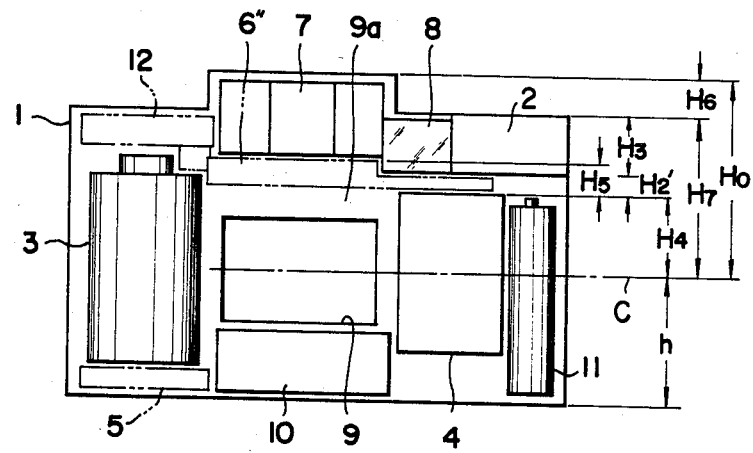
Figure 3:
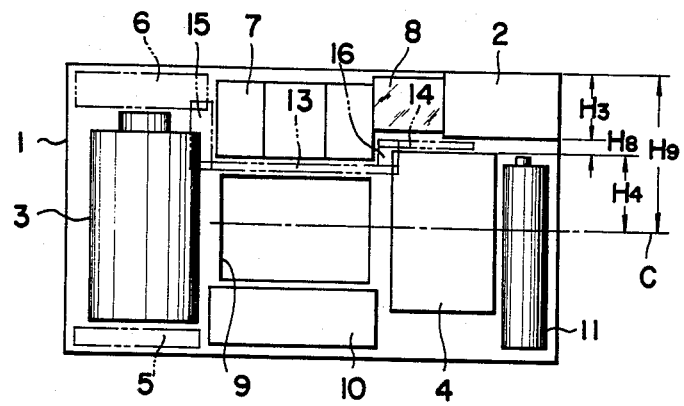
FIG. 3 is a front arrangement and block elevation of a compact camera according to the invention.
Figure 4:
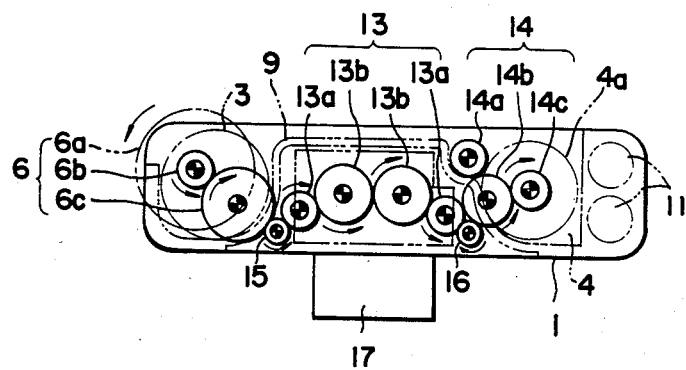
FIG. 4 is a plan arrangement view of an interlocking gear.

Now, an embodiment of the present invention will be described. FIG. 3 shows the arrangement of camera main body 1 corresponding to FIGS. 1 and 2. The same symbols are used for identical parts of each Figure. Cartridge 3 is positioned on the left of aperture 9 and spool chamber 4 on the right thereof. The arrangement is identical to that of FIG. 2. Between cartridge chamber 3 and spool 4, auto focus mechanism 7 is accommodated at the upper part of aperture 9 at the same height as strobe mechanism 2 and contained in camera main body 1. The film winding and shutter charge gear 6 are mounted at the upper part of cartridge chamber 3 at the same height as auto focus mechanism 7. Film winding gear train 14 is mounted between spool chamber 4 and strobe mechanism 2. Transmission gears 15 and 16 are mounted and engaged for interlocking rotation of said film winding and shutter charge gear 6 with film winding gear train 14. Transmission devices such as interlocking gear train 13, etc., which are interlocked with transmission gears 15 and 16, are mounted between aperture 9 and auto focus mechanism 7. The arrangement of gears is shown in FIG. 4. Gear 6c engages with gear 6b, which has a common shaft with film winding knob 6a, and also engages with transmission gear 15. Interlocking gear train 13 connects the transmission gears 15 and 16, and consists of a pair of small gears 13a and a pair of large gears 13b. Film winding gear train 14 is engaged with gear 14c of spool shaft 4a through gears 14a and 14b, and the transmission gear 16 meshes with the gear 14b. The number of teeth on the transmission gears 15 and 16 is the same. 17 is a lens unit. The gear 14a has claws (not shown) on the same axis thereof to engage with sprocket holes (not shown) in the film.

According to the above-described construction, height $H_9$ above light-axis center C of camera main body is the total of $H_4$ (half height of spool chamber 4), $H_3$ (height of strobe mechanism 2) and $H_8$ (thickness of film winding gear) $(H_9 = H_4 + H_8 + H_3)$. When $H_0 = H_2' + H_3 + H_4 + H_6$ (height above light-axis center C of the compact camera shown in FIG. 2) is compared with this, $H_0 - H_9 = H_2' + H_6 - H_8$ is obtained where, $H_2'$ and $H_8$ are gear thickness and may be identical ($H_2' \approx H_8$). Thus, $H_0 - H_9 = H_6$ is obtained. The compact camera according to this invention is miniaturized by the projected height of auto focus mechanism 7 of the compact camera shown in FIG. 2.

As for the operation of said interlocking gear train 13, shutter charge is made when the winding knob is rotated counter clockwise in FIG. 4. A film is wound into spool chamber 4 from cartridge chamber 3 to prepare for photographing when transmission gear 15 is rotated counter clockwise through gear 6b and 6c, transmission gear 16 is rotated clockwise through interlocking gear 13, film winding gear train 14 makes interlocking rotation and spool shaft 4a is rotated clockwise.

A belt can be used instead of interlocking gear train 13, changing transmission gear 15 and 16 to pulleys.

As has been described in the foregoing, according to the invention, the auto focus mechanism is arranged between the cartridge chamber and the spool chamber, and above the aperture at the same height as that of the strobe mechanism, the strobe mechanism is mounted above the spool chamber, the film winding and shutter charge gear is mounted above the cartridge chamber, the film winding gear is mounted between the spool chamber and the strobe mechanism, and transmission means are mounted between these gears and between the aperture and auto focus mechanism for interlocking rotation of these gears. Thus, height $H_9$ above light-axis center C of this type of existing compact camera is reduced and furter miniaturization is made. Therefore, it has effected improvement in portability and operability.

What is claimed is:

1. A compact camera including a housing carrying an image transmitting aperture having a light-axis center, said camera comprising:
    an auto focus mechanism positioned above the aperture;
    a film cartridge chamber and a film spool chamber disposed on opposite sides of the aperture;
    a strobe mechanism mounted above the film spool chamber, said auto focus mechanism positioned between the film cartridge chamber and the spool chamber, and having an upper surface at substantially the same height above the light axis center as an upper surface of the strobe mechanism;
    film winding and shutter charge gear means mounted above the film cartridge, and a film winding gear means mounted between the film spool chamber and the strobe mechanism; and
    transmission means extending between and interconnecting each of said gear means and positioned between the aperture and the auto focus mechanism for interlocking the rotation of said respective gear means, said transmission means comprising a first transmission gear meshing with and extending downwardly from the film winding and shutter charge gear means toward the light-axis center, a second transmission gear meshing with and extending downwardly from the film winding gear means toward the light-axis center, and interconnecting means for interconnecting the first and second transmission gears.

2. A compact camera as claimed in claim 1, in which said interconnecting means includes a gear train.

3. A compact camera as claimed in claim 1, wherein the number of teeth on each of the transmission gears is the same.

4. A compact camera as claimed in claim 1, in which the housing has a top and a bottom and the height of the top of the housing above the light-axis center is substantially equal to the sum of one-half the height of the film spool chamber and the height of the strobe mechanism.

* * * * *